United States Patent [19]

Lecoffre et al.

[11] Patent Number: 4,702,837

[45] Date of Patent: Oct. 27, 1987

[54] ROTARY VORTEX SEPARATOR FOR A HETEROGENEOUS LIQUID

[75] Inventors: Yves Lecoffre, Le Versoud; Jacques Woillez, Grenoble, both of France

[73] Assignee: TOTAL Compagnie Francaise des Petroles, Paris, France

[21] Appl. No.: 945,711

[22] Filed: Dec. 23, 1986

[30] Foreign Application Priority Data

Jan. 2, 1986 [FR] France ................................ 8600015

[51] Int. Cl.[4] ............................................ B01D 17/038

[52] U.S. Cl. ................................. 210/512.3; 210/541; 210/542; 494/85; 494/901

[58] Field of Search .................. 210/359, 360.1, 360.2; 210/369, 371, 377, 378, 380.1, 380.3, 541, 542, 381, 512.1, 512.3; 494/83, 84, 85, 901; 55/470, 471, 473; 209/171, 198, 199, 144, 211

[56] References Cited

U.S. PATENT DOCUMENTS 2,138,468 11/1938 Ayres .

2,259,665 10/1941 Serrell .

FOREIGN PATENT DOCUMENTS 0037347 10/1981 European Pat. Off. .

1186412 1/1965 Fed. Rep. of Germany .

2091170 1/1972 France .

*Primary Examiner*—Frank Sever

*Attorney, Agent, or Firm*—Sughrue, Mion, Zinn, Macpeak, and Seas

[57] ABSTRACT

A rotary vortex separator for heterogeneous liquids, e.g. water with a small oil content on an offshore oil platform, includes injection channels (30) which inject water to be de-oiled at an axial speed relative to the periphery of the separator at the upstream end (4) of a cylindrical separation chamber (2) rotating about its axis (8). Purified water leaves from the other end (6) of said chamber via an annular outlet opening (26) of smaller radius to constitute a free vortex type of flow. The oil is removed by an axial tube (28).

11 Claims, 2 Drawing Figures

ROTARY VORTEX SEPARATOR FOR A HETEROGENEOUS LIQUID

The present invention relates to separating two phases of a heterogeneous liquid.

BACKGROUND OF THE INVENTION

In very many industrial applications it is necessary to separate two immiscible fluids of different densities, with one of the fluids being dispersed in the other in the form of globules which may be very small in size.

The proposed invention relates more particularly to purifying reinjection or waste water on offshore oil platforms. In this particular case, droplets of oil need to be extracted from a main flow of water. This "de-oiling" operation must be performed by an apparatus or a set of apparatuses capable of combining as far as possible four essential qualities:

A first quality is separation efficiency. The rate at which the apparatus purifies waste water must be as high as possible. This efficiency is conventionally measured by means of the apparatus cutoff diameter i.e. the globule diameter beyond which all oil globules are removed from the flow of water. Depending on the values of this cutoff diameter, the purification may need to be performed in one, two, or even three stages using a corresponding number of different types of separator connected in series.

A second quality is compactness. Given the very high cost of each "shipped ton" on a platform, platform operators look for apparatuses whose weight and volume are as small as possible. The compactness of an apparatus is characterized, above all, by the length of time the mixture remains in the apparatus: the shorter this length of time, the greater the extent to which volume and weight are reduced.

A third quality is flow rate flexibility. In operation, the flow rate of water to be treated may vary by as much as $-50\%$ to $-100\%$ from the nominal flow rate, for example over period of a few minutes. It is thus important for the separators to be able to treat such fluctuating flows without losing de-oiling efficiency. In addition, users are looking for apparatuses having as high a flow rate as possible per unit so as to be able to perform treatment with a minimum number of apparatuses.

The fourth quality is low energy consumption. Energy consumption is not a crucial problem on an operating platform, but the available pressures are often limited to a few bars. However, it may be considered that an apparatus consumes energy in the form of head loss, thereby causing zones of intense hydraulic shear to appear which split up the drops of oil into droplets which are so small as to become unseparable. Roughly speaking, the lower the head loss required to obtain separation, the greater the efficiency of the apparatus.

More or less similar qualities are desirable for other operations such as de-watering crude oil and degassing liquids, and more generally for any industrial operation which makes use either of hYdrocyclones or else of centrifuges.

In conventional hydrocyclones used for de-oiling, an intense acceleration field is created by rotating fluid which enters a fixed wall separation chamber tangentially in order to establish a free vortex type of flow. Uhder the effect of centrifugal force, oil concentrates on an axial core and is removed via a special outlet. The intensity of this force is at a maximum at the interface between the core and the surrounding liquid.

In centrifuges which have been developed for dewatering crude oil, the fluid is set into rotation by rotating the walls of the separation chamber by means of an external power source (a motor). These apparatuses set up a bulk rotary flow in which the speed of rotation and centrifugal force are very low in the vicinity of the axis. Uhder these conditions it is impossible to concentrate the light phase sufficiently to be able to extract the heavy phase easily. In contrast, in a free vortex type of flow, the very high speeds of rotation in the vicinity of the axis ensure that a stable core of light phase is formed.

Further, French Pat. No. 80 07 244 published under the No. 2 478 489 and its corresponding U.S. Pat. No. 4,443,331 describe a separator used in the paper pulp industry. In this apparatus, the walls of the separation chamber are rotated and a free vortex type of flow is set up in its inside volume, with the radius of the outlet opening for the majority liquid being smaller than the radius of the inlet opening. Inlet acceleration guides cause the inlet liquid to rotate and move radially away from the axis of the separator up to the inlet opening radius. Their downstream portions constitute injection blades which cause the inlet liquid to move at constant radius and which are inclined to the axis in such a manner as to give said liquid, when it leaves the blades to enter the separation chamber, an absolute circumferential speed in the same direction as and greater than the absolute circumferential speed of the rotating side wall of said chamber. As a result, friction between said liquid and said wall then sets up a radial gradient in the circumferential speed of the liquid in the vicinity of the wall. This gradient provides stirring. Said French patent indicates that in other separators "the absence of any stirring" leads to the drawback that the "fibrous constituents" of the inlet liquid "tend to associate very rapidly in a coherent network which . . . prevents any displacement within the fluid".

Other such separators are the centrifuges described in French Pat. No. 2 091 170 and the corresponding U.S. Pat. No. 3,862,714 (Broadway).

The aim of the present invention is to obtain improved separation efficiency over prior art separators in a simple manner.

Another aim is to simultaneously improve compactness, flow rate flexibility, and energy consumption of a separator, in particular for the case where a dispersed light fluid such as oil or air is to be separated from a main liquid such as water.

SUMMARY OF THE INVENTION

The present invention provides a rotary vortex separator for a heterogeneous liquid, said separator being provided to receive a flow of a heterogeneous inlet liquid constituted by a main liquid and by dispersed globules of an additional fluid having a different density from the main liquid, said separator being intended to have the following outlets: firstly a major flow of a main outlet liquid constituted by said main liquid with at least a portion of said additional fluid removed therefrom, and secondly a minor flow of a secondary outlet fluid containing an increased proportion of said additional fluid, said separator having a longitudinal separator axis (8) and comprising an elongate separation chamber (2) having an upstream end (4), a downstream end (6), and a side wall (7) which is circularly symmetrical about said axis, the radius of said chamber at said upstream end constituting an inlet radius, drive means (12, 14, 16) for rotating said wall about said axis, an inlet duct (18, 19) for receiving said inlet liquid close to the upstream end of said chamber, preferably inlet accelerator guides (20) distributed around said axis and rotating with said wall, each of said guides having an inside edge (22) at a distance from said axis which is less than said inlet radius for receiving said liquid leaving said inlet duct, each of said guides extending to an outer edge (24) further from said axis for moving said liquid out to a distance from said axis which is substantially equal to said inlet radius while simultaneously impressing an increased circumferential speed thereto prior to inserting the liquid into said chamber, said chamber also having a coaxial main outlet opening (26) formed at said downstream end (6) and having an outside radius which is less than said inlet radius in such a manner that said main outlet liquid leaves via said opening while creating a free vortex type of flow in said chamber with the circumferential speed of the liquid increasing from the rotary wall (10) towards an axial zone, and in such a manner that an increased centrifugal force concentrates the higher density fluid towards the wall and the lower density fluid towards said axial zone, and at least one secondary outlet opening (28) for delivering said secondary outlet fluid, said opening being located in a zone where the centrifugal force concentrates said fluid, said separator further comprising liquid injection channels (30) in said separation chamber (2), said channels being fixed to rotate with said rotary wall (10), each having a channel axis which is coplanar with said separator axis (8), and being distributed around said separator axis, each of said channels having an inlet (32) for receiving said inlet liquid at the outlet from said inlet accelerator guides (20) or in the absence of such guides from said inlet duct (18, 19), an outlet (24) situated at a distance from said axis which is substantially equal to said inlet radius in order to feed the inlet end (4) of the separation chamber, and sufficient length relative to its transverse dimensions to ensure that the relative circumferential speed of said inlet liquid relative to said rotary wall is substantially cancelled when said liquid enters said separation chamber, thereby preventing friction between the liquid and said wall from causing a radial gradient of circumferential speed to appear which would continue against said wall along the length of said chamber, and such that said gradient does not set up turbulence suitable for compensating the separating action of the centrifugal force in the vicinity of said wall on the relatively small globules of said additional fluid.

The present invention allows speed gradients to remain, particularly in the vicinity of said axial vortex zone. However, the inevitable turbulence in this zone gives rise to reduced drawbacks by virtue of the very high value of the centrifugal force thereat. In contrast, close to the wall where the centrifugal force is relatively low, it appears to be important to limit speed gradients as much as possible, and in particular the radial gradient of circumferential speed.

Naturally, the present invention is characterized by the dispositions taken and not by the above explanations of their operation, which explanations are given purely by way of hypothesis.

The present invention preferably adopts the following advantageous dispositions, where appropriate:

said injection channels (30) are cylindrical or prismatic and are more than four times and are preferably six times as long as their smallest transverse dimension, and are parallel to said axis (8).

Said rotary side wall (10) is cylindrioal, said main outlet opening (26) being formed in an outlet diaphragm (36) occupying the downstream end (6) of the separation chamber (2), said opening having an outside radius lying in the range 20% to 60% of the radius of said side wall.

Said injection channels (30) have their outlets (34) around a circular injection ring whose outer circle is in contact with said rotary wall (10), said separation chamber (2) further including an inlet nose (38) which is coaxial with said chamber, which has a base coinciding with the inside circle of said ring, and which projects into said chamber from said base having circular sections of progressively tapering radius, with the length of said nose being less than one-third of the length of the chamber, in such a manner as firstly to offer said inlet liquid an annular flow path of progressively increasing area from said injection ring in order to rapidly reduce its axial speed without turbulence, and secondly to center and stabilize said free vortex. Said nose (38) may be conical, for example, having a half angle at the apex lying in the range 10° to 40°, and being about 20°, for example.

The invention is advantageously applied to the case where the separator is provided to receive one such inlet liquid in which the said dispersed added fluid is less dense than said main liquid so that said additional fluid forms an axial core in said separation chamber. In this case, said secondary outlet opening is constituted by a secondary outlet tube (28) at the downstream end (6) of said separation chamber (2), said tube penetrating coaxially into said separation chamber (2) through said main outlet opening (26), which constitutes an annular opening around said tube. This downstream disposition of this tube avoids the need to provide an axial secondary outlet at the upstream end of the separator where it would get in the way. Said inlet duct (18, 19) then comprises a fixed inlet tube (18) coaxial with said chamber, in such a manner that the inside edge (22) of said inlet accelerator guide (20) is close to said axis (8) and that the rotation of said inlet liquid by said guides does not cause unwanted shear to appear in said liquid suitable for breaking said globules of additional fluid and for making said globules impossible to separate.

Said inlet duct (18, 19) further includes, between the outlet from said fixed inlet tube (18) and said inlet accelerator guides (20), a rotary inlet tube (19) fixed to said guides, in such a manner as to begin rotating the inlet liquid before it encounters the inside edges (22) of said guides, and thereby reduce said unwanted shear.

Said fixed coaxial inlet tube (18) is a rigid support tube and carries an upstream bearing (39) on its outside, said rotary cylindrical side wall (10) being provided with an upstream extension (40) which is coaxial and rigid and extends up to said bearing in order to be supported thereby, a sealing gasket (60) being disposed between said rotary upstream extension and said fixed support tube between the outlet end of said tube and said bearing in such a manner as to prevent the liquid from reaching the bearing.

Said main outlet opening (26) extends downstream in the form of a diverging member (42) up to a main outlet chamber (44) of increased annular flow section around said seoondary outlet tube (28) in such a manner as to reduce the energy consumption of the separator, the side wall (46) of said outlet chamber being constituted by a rigid coaxial downstream extension of said rotary side wall of the separation chamber, said extension carrying a downstream bearing (48) on its outside bearing against a fixed external support (47) and which co-operates with said upstream bearing (39) in order to hold said separating chamber (2), a sealing gasket (62) being disposed between said fixed support (47) and said rotary downstream extension (46), between the outlet from said extension and said bearing in such a manner as to prevent the liquid from reaching said bearing.

BRIEF DESCRIPTION OF THE DRAWINGS

An implementation of the invention is described below more particularly by way of non-limiting example with reference to the accompanying diagrammatic figures. It must be understood that the items described and shown may, without going beyond the scope of the invention, be replaced by other items providing the same technical functions. Whenever the same item is shown in several figures, it is designated therein by the same reference symbol. Wherever symbols have been used above in parentheses, it is purely by way of non-limiting example.

MORE DETAILED DESCRIPTION

Figure 1:
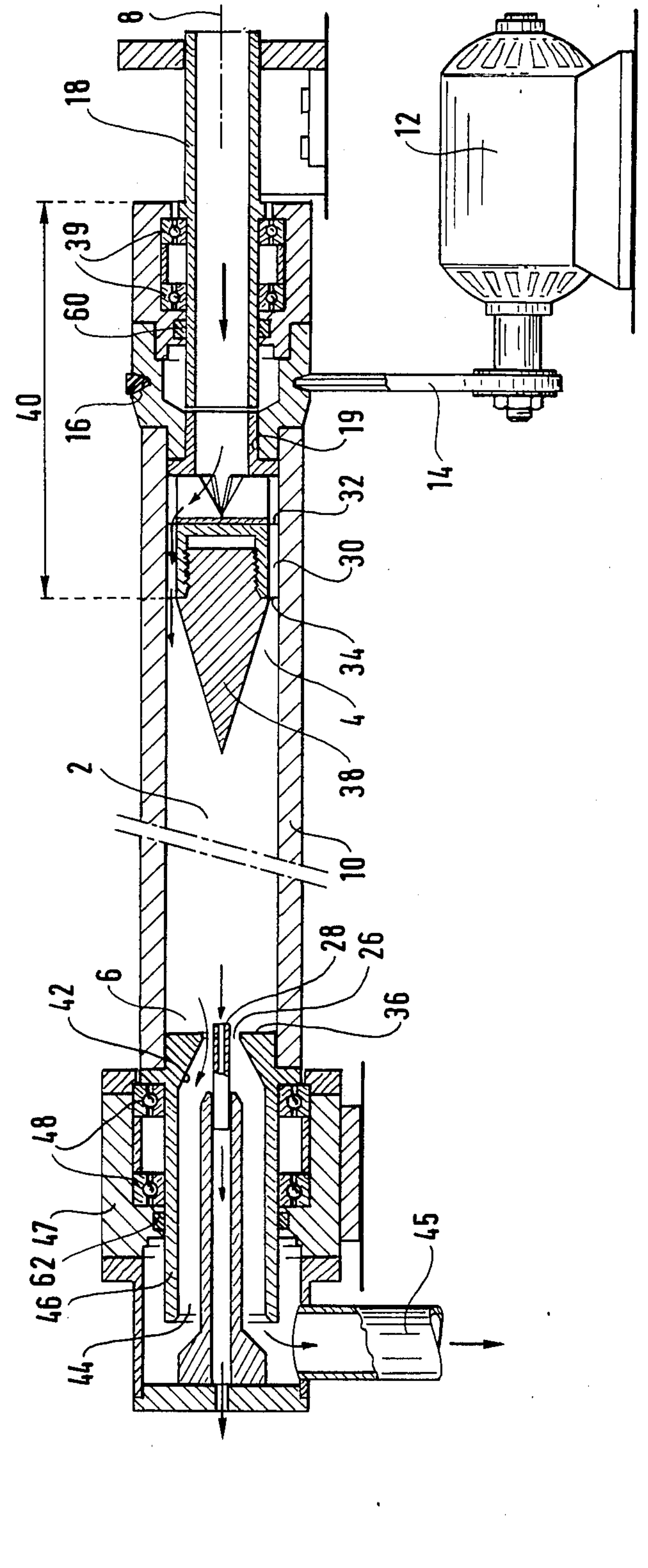
FIG. 1 is a general axial section view of a separator in accordance with the invention.
Figure 2:
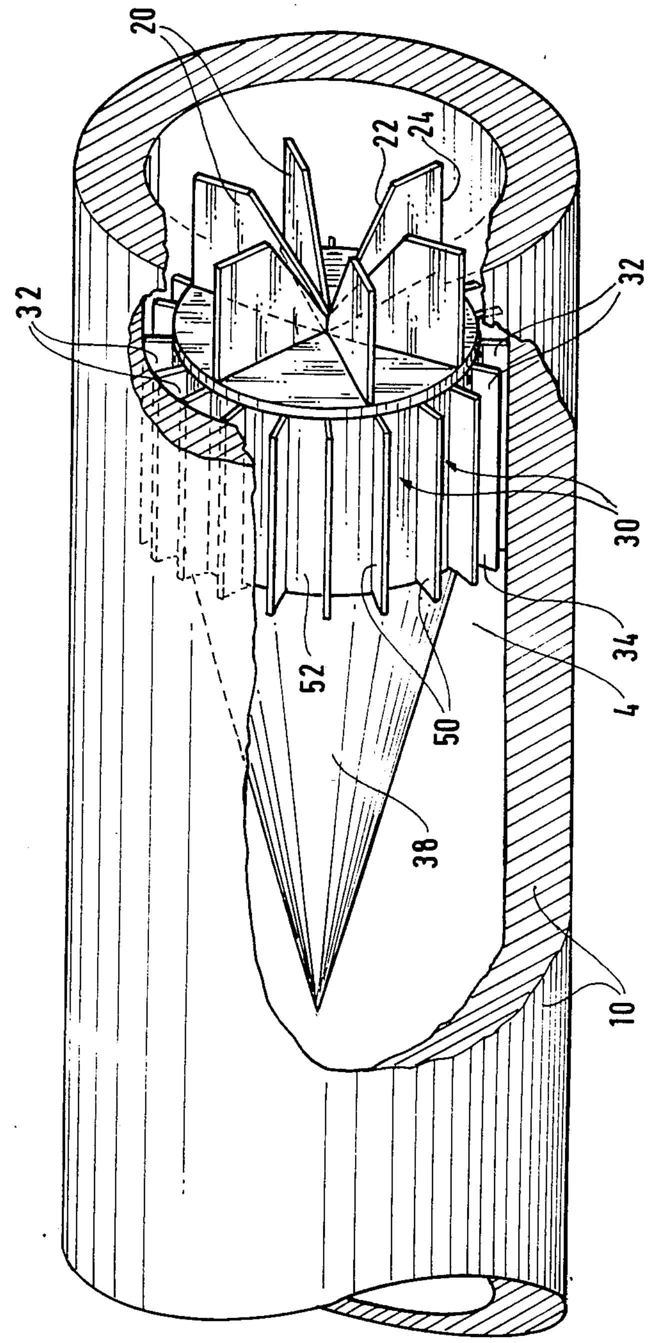
FIG. 2 is a perspective view of the inlet accelerator guides and the injection ducts of the same separator with its side wall being partially cut away.

The separator described includes the dispositions mentioned above as being advantageous in accordance with the invention.

It comprises the following items:

A separation chamber 2 whose side wall 10 is circularly cylindrical about an axis 8 of the separator and extends between an upstream end 4 and a downstream end 6.

Drive means constituted by a motor 12 which drives a belt received in a groove 16 formed in an upstream extension 40 of the wall 10 in order to rotate the wall 10 about its axis.

An inlet duct constituted by a fixed rigid tube 18 followed by a rotary tube 19 fixed to the wall 10. The fixed tube has two ball bearings 38 mounted on the outside thereof inside the rigid cylindrical extension 40 in order to constitute the above-mentioned upstream bearing and to hold the rotary wall 10.

Ten trapezoidal inlet accelerator guides 20 regularly distributed around the axis 8 at the outlet from the tube 19. Only six such guides are shown in the figure in order to make it easier to understand. Each guide has a sloping inside edge 22 which meets the axis 8 at its end furthest from the tube 19, an upstream radial edge and a downstream radial edge, and an axial outer edge at a distance from the axis which is slightly less than the diameter of the chamber 2. These guides are welded along their upstream radial edges to the rotary tube 19.

The ten inside edges lie along generator lines of a cone which is open towards said tube 19 in order to receive the inlet liquid. The liquid is rotated and driven towards the periphery up to the upstream extension of the wall 10.

Twenty or thirty injection channels 30 extend axially over the axial gap between the guides 20 and the inlet 4 to the chamber 2. These channels are formed by axial radial walls 50 fixed to the cylindrical side surface of a part 52 which is in turn fixed to the downstream radial edges of the guides 20. This part extends coaxially to the inside of the cylindrical extension of the wall 10. Downstream from this part there is a conical inlet cone 38 which is fixed coaxially and which penetrates into the chamber 2 to form an annular chamber of increasing section together with the wall 10 and also to stabilize the vortex in said chamber.

The downstream end of chamber 2 is occupied by a part 36 which forms, in particular, the above-mentioned outlet diaphragm whose central opening constitutes the main outlet opening for de-oiled water. Downstream from this opening, the inside surface of said part is initially conical in order to constitute a diverging passage 42, and then it becomes cylindrical in its downstream portion 46 in order to constitute a rotating outlet chamber 44 opening out into a fixed outlet chamber. The fixed outlet chamber communicates with a main outlet pipe 45 via which the de-oiled water is removed from the separator. This downstream portion 46 simultaneously constitutes a rigid downstream extension of the wall 10 and has two ball bearings 48 on the outside thereof to constitute the above-mentioned downstream bearing, with the bearing being mounted in a fixed hollow downstream body 47. This body forms said fixed outlet chamber from which the main outlet pipe 45 leads away.

The secondary outlet opening for oil is constituted by a fixed tube 28 which passes axially through the downstream body 47 and the outlet diaphragm 36.

In a particular case for treating a water flow rate of one liter/second (l/s) containing a proportion of oil lying in the range 0.1% to 1%, with said oil having a density of about 0.85, the separation chamber was 500 mm long with an inside diameter of 60 mm. It rotated at 1800 revolutions per minute. The injection channels were 50 mm long and had a transverse radial dimension of 5 mm with their circumferential transverse dimension being about 9 mm.

The main outlet opening formed in the diaphragm had a diameter of 20 mm, and the secondary outlet tube had an inside diameter of 8 mm. The inlet duct had a diameter of 30 mm.

We claim:

1. A rotary vortex separator for a hetrrogeneous liquid, comprising:

means for receiving a flow of a heterogeneous inlet liquid constituted by a main liquid and by dispersed globules of an additional fluid having a different density from the main liquid, and having a first outlet for a major flow of a main outlet liquid constituted by said main liquid with at least a portion of said additional fluid removed therefrom, and a second outlet for a minor flow of a secondary outlet fluid containing an increased proportion of said additional fluid, said separator having a longitudinal separator axis and comprising an elongate separation chamber having an upstream end, a downstream end, and a side wall which is circularly symmetrical about said axis, the radius of said chamber at said upstream end constituting an inlet radius, drive means for rotating said wall about said axis, an inlet duct for receiving said inlet liquid close to the upstream end of said chamber, inlet accelerator guides distributed around said axis and rotating with said wall, each of said guides having an inside edge at a distance from said axis which is less than said inlet radius for receiving said liquid leaving said inlet duct, each of said guides extending to an outer edge further from said axis for moving said liquid out to a distance from said axis which is substantially equal to said inlet radius while simultaneously impressing an increased circumferential speed thereto prior to inserting the liquid into said chamber, said chamber also having a coaxial main outlet opening formed at said downstream end and having an outside radius which is less than said inlet radius in such a manner that said main outlet liquid leaves via said opening while creating a free vortex type of flow in said chamber with the circumferential speed of the liquid increasing from the rotary wall towards an axial zone, and in such a manner that an increased centrifugal force concentrates the higher density fluid towards the wall and the lower density fluid towards said axial zone, and at least one secondary outlet opening for delivering said secondary outlet fluid, said opening being located in a zone where the centrifugal force concentrates said fluid, said separator further comprising liquid injection channels in said separation chamber, said channels being fixed to rotate with said rotary wall, each having a channl axis which is generally coplanar with said separator axis, and being distributed around said separator axis, each of said channels having an inlet for receiving said inlet liquid at the outlet from said inlet accelerator guides, an outlet situated at a distance from said axis which is substantially equal to said inlet radius in order to feed the inlet end of the separation chamber, and sufficient length relative to its transverse dimensions to ensure that the relative circumferential speed of said inlet liquid relative to said rotary wall is substantially cancelled when said liquid enters said separation chamber, for preventing friction between the liquid and said wall from causing a radial gradient of circumferential speed to appear which would continue against said wall along the length of said chamber, and such that said gradient does not set up turbulence suitable for compensating the separating action of the centrifugal force in the vicinity of said wall on the relatively small globules of said additional fluid.

2. A separator according to claim 1, wherein said injection channels are cylindrical or prismatic and are more than four times as long as their smallest transverse dimension.

3. A separator acording to claim 2, wherein said injection channels are parallel to said axis.

4. A separator according to claim 1, wherein said rotary side wall is cylindrical, said main outlet opening being formed in an outlet diapharagm occupying the downstream end of the separation chamber, said opening having an outside radius lying in the range 20% to 60% of the radius of said side wall.

5. A separator according to claim 4, wherein said injection channels have their outlets around a circular injection ring whose outer circle is in contact with said rotary wall, said separation chamber further including an inlet nose which is coaxial with said chamber, which has a base coinciding with the inside circle of said ring, and which projects into said chamber from said base having circular sections of progressively tapering radius, with the length of said nose being less than one-third of the length of the chamber, in such a manner as firstly to offer said inlet liquid an annular flow path of progressively increasing area from said injection ring in order to rapidlY reduce its axial speed without turbulence, and secondly to center and stabilize said free vortex.

6. A separator according to claim 5, wherein the inlet nose is conical having a half angle at the apex lying in the range 10° to 40°.

7. A separator according to claim 1, for receiving one such inlet liquid in which the said dispersed added fluid is less dense than said main liquid so that said additional fluid forms an axial core in said separation chamber, said separator being wherein said secondary outlet opening is constituted by a secondary outlet tube at the downstream end of said separation chamber, said tube penetrating coaxially into said separation chamber through said main outlet opening, which constitutes an annular opening around said tube, said inlet duct comprising a fixed inlet tube coaxial with said chamber, in such a manner that the inside edge of said inlet accelerator guide is close to said axis and that the rotation of said inlet liquid by said guides does not cause unwanted shear to appear in said liquid suitable for breaking said globules of additional fluid and for making said globules impossible to separate.

8. A separator according to claim 7, wherein said inlet duct further includes, between the outlet from said fixed inlet tube and said inlet accelerator guides, a rotary inlet tube fixed to said guides, in such a manner as to begin rotating the inlet liquid before it encounters the inside edges of said guides, and thereby reduce said unwanted shear.

9. A separator according to claim 7, wherein said fixed coaxial inlet tube is a rigid support tube and carries an upstream bearing on its outside, said rotary cylindrical side wall being provided with an upstream extension which is coaxial and rigid and extends up to said bearing in order to be supported thereby, a sealing gasket being disposed between said rotary upstream extension and said fixed support tube between the outlet end of said tube and said bearing in such a manner as to prevent the liquid from reaching the bearing.

10. A separator according to claim 9, wherein said main outlet opening extends downstream in the form of a diverging member up to a main outlet chamber of increased annular flow section around said secondary outlet tube in such a manner as to reduce the energy consumption of the separator, the side wall of said outlet chamber being constituted by a rigid coaxial downstream extension of said rotary side wall of the separation chamber, said extension carrying a downstream bearing on its outside bearing against a fixed external support and which co-operates with said upstream bearing in order to hold said separating chamber, a sealing gasket being disposed between said fixed support and said rotary downstream extension, between the outlet from said extension and said bearing in such a manner as to prevent the liquid from reaching said bearing.

11. A rotary vortex separator for a heterogeneous liquid, comprising:

means for receiving a flow of a heterogeneous inlet liquid constituted by a main liquid and by dispersed globules of an additional fluid having a different density from the main liquid, and having a first outlet for a major flow of a main outlet liquid constituted by said main liquid with at least a portion of said additional fluid removed therefrom, and a second outlet for a minor flow of a secondary outlet fluid containing an increased proporation of said additional fluid, said separator having a longitudinal separator axis and comprising an elongate separation chamber having an upstream end, a downstream end, and a side wall which is circularly symmetrical about said axis, the radius of said chamber at said upstream end constituting an inlet radius, drive means for rotating said wall about said axis, an inlet duct for receiving said inlet liquid close to the upstream end of said chamber, said chamber also having a coaxial main outlet opening formed at said downstream end and having an outside radius which is less than said inlet radius in such a manner that said main outlet liquid leaves via said opening while creating a free vortex type of flow in said chamber with the circumferential speed of the liquid increasing from the rotary wall towards an axial zone, and in such a manner that an increased centrifugal force concentrates the higher density fluid towards the wall and the lower density fluid towards said axial zone, and at least one secondary outlet opening for delivering said secondary outlet fluid, said opening being lcoated in a zone where the centrifugal force concentrates said fluid, said separator further comprising liquid injection channels in said separation chamber, said channels being fixed to rotate with said rotary wall, each having a channel axis which is generally coplanar with said separator axis, and being distributed around said separator axis, each of said channels having an inlet for receiving said inlet liquid from said inlet duct, an outlet situated at a distance from said axis which is subsbtatially equal to said inlet radius in order to feed the inlet end of the separation chamber, and sufficient length relative to its transverse dimensions to ensure that the relative circumferential speed of said inlet liquid relative to said rotary wall is substantially cancelled when said liquid enters said separation chamber, for preventing friction between the liquid and said wall from causing a radial gradient of circumferential speed to appear which would continue against said wall along the length of said chamber, and such that said gradient does not set up turbulence suitable for compensating the separating action of the centrifugal force in the vicinity of said wall on the relatively small globules of said additional fluid.

* * * * *